United States Patent
Davidson et al.

(10) Patent No.: US 7,130,030 B2
(45) Date of Patent: Oct. 31, 2006

(54) SYSTEM AND METHOD FOR RAPIDLY ACHIEVING OPTIMUM DISPERSION IN OPTICAL TRANSMISSION SYSTEMS

(75) Inventors: Carl R. Davidson, Warren, NJ (US); Robert R. Cordell, Holmdel, NJ (US); Yi Cai, Eatontown, NJ (US); Hongbin Zhang, Eatontown, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 334 days.

(21) Appl. No.: 10/677,193

(22) Filed: Oct. 2, 2003

(65) Prior Publication Data
US 2004/0141172 A1    Jul. 22, 2004

Related U.S. Application Data

(60) Provisional application No. 60/415,735, filed on Oct. 3, 2002.

(51) Int. Cl.
   *G01N 21/00*    (2006.01)
(52) U.S. Cl. .................................................. 356/73.1
(58) Field of Classification Search ............. None
   See application file for complete search history.

(56) References Cited

U.S. PATENT DOCUMENTS

| | | | |
|---|---|---|---|
| 5,757,531 A * | 5/1998 | Tomesen et al. ............ | 398/204 |
| 6,081,360 A | 6/2000 | Ishikawa et al. | |
| 6,137,604 A | 10/2000 | Bergano | |
| 6,501,580 B1 | 12/2002 | Ishikawa et al. | |
| 6,515,779 B1 | 2/2003 | Fee | |
| 6,567,577 B1 | 5/2003 | Abbott et al. | |
| 6,573,985 B1 * | 6/2003 | Ibukuro et al. ............ | 356/73.1 |
| 6,580,542 B1 | 6/2003 | Song et al. | |
| 6,584,262 B1 | 6/2003 | Pilipetskii et al. | |
| 6,587,190 B1 | 7/2003 | Chae et al. | |
| 6,614,512 B1 | 9/2003 | Sakamoto et al. | |
| 6,865,348 B1 * | 3/2005 | Miyamoto et al. .......... | 398/183 |

FOREIGN PATENT DOCUMENTS

| | | |
|---|---|---|
| EP | 1011218 A2 | 6/2000 |
| EP | 1195927 A2 | 4/2002 |

OTHER PUBLICATIONS

European Search Report issued on Jan. 24, 2006 corresponding to European Patent Appln. No. 03256219.1 (3 pgs).

* cited by examiner

*Primary Examiner*—Tu T. Nguyen
(74) *Attorney, Agent, or Firm*—Grossman, Tucker, Perreault & Pfleger, PLLC (57) ABSTRACT

A system and method for optimizing dispersion in an optical transmission line is provided. The system and method comprise measuring the amplitude of a d.c. voltage component of a synchronously demodulated data signal of at least one wavelength channel by an in-phase carrier at the baud frequency of the wavelength channel. In an alternative embodiment, the system and method comprise measuring the IF amplitude of the resulting a.c. signal of a data signal of the at least one wavelength channel comprising a received RZ signal mixed with a local oscillator, whose frequency differs from the wavelength channel baud by a relatively small amount, somewhere on the order of about 100 kHz.

28 Claims, 9 Drawing Sheets

SYSTEM AND METHOD FOR RAPIDLY ACHIEVING OPTIMUM DISPERSION IN OPTICAL TRANSMISSION SYSTEMS

CROSS REFERENCE TO RELATED APPLICATION

This application is based on and claims the benefit of U.S. Provisional Application Ser. No. 60/415,735, entitled METHOD AND APPARATUS TO RAPIDLY ACHIEVE OPTIMUM DISPERSION COMPENSATION IN LIGHTWAVE SYSTEMS, filed Oct. 3, 2002, the entire disclosure of which is incorporated by reference herein.

BACKGROUND OF THE INVENTION

The present invention relates to a system and method for employing dispersion management techniques in an optical transmission system and in particular to achieving dispersion optimization by conducting real-time measurements of demodulated received signals from an optical transmission line.

In optical transmission systems, especially wavelength division multiplexed (WDM) long-haul and ultra long-haul optical transmission systems, a major design issue includes fiber dispersion (or chromatic dispersion) management. The maximum bit rate of WDM systems is limited by, among other things, the group-velocity dispersion (GVD). Dispersion is commonly defined as the separation of a beam into its various wavelength components. In an optical transmission system, especially WDM systems, dispersion penalties occur because the differing wavelengths propagate at differing speeds and a receiver must account for such differences or the received signal will be diminished if not undetectable. Dispersion optimization is also an essential part of high bit-rate system installation. Managing dispersion is thus important in optical transmission systems, especially WDM systems.

One of the major challenges in WDM and wideband dense WDM (DWDM) long-haul transmission systems, in terms of dispersion management strategy, is to optimize pre and post dispersion compensation in order to correct for accumulated dispersion at the receiver. The ratio of pre/post dispersion serves to pre-bias the transmitted pulse to mitigate the non-linear effects during transmission and to effectively reconstruct the transmitted pulse at the receiver. That is, transmission performance of high bit-rate systems strongly depends on residual dispersion as well as the ratio of dispersion pre-compensation to total dispersion compensation (i.e., dispersion split ratio).

Most of the research surrounding dispersion management studies is generated through modeling and experimentally verified through loop experiments before being transferred to a fielded system. Currently, in experimental and field deployed systems, the exhaustive search for the optimum dispersion compensation values and ratios involves the arduous task of setting the likely dispersion, measuring the Q-factor (or bit error rate [BER]) and observing the received eye diagram. Then, if not optimum, the tester must change the dispersion setting, measure the Q-factor again and observe the received eye diagram again and again until optimum dispersion is achieved for a given wavelength channel. Furthermore, this must be done for each wavelength in the transmission line.

Known processes are slow and cumbersome. For example, in conventional systems, after establishing an optical connection, the dispersion is optimized using a kind of channel performance optimization, where pre/post compensation values are changed to achieve best performance. It may take several iterations before the optimum pre/post dispersion ratios are found for a given deployed system. Then, as the system ages, the optimum dispersion may change. Testing for optimum dispersion may be needed again to compensate for the aged transmission system and the same time consuming tests would have to be employed.

Known methods for optimizing dispersion use BER or Q-factor measurements, which, as mentioned above, are usually time consuming and the metric requires numerous adjustments. In addition, the error performance of the recovered digital signal must be measured, which makes the task of determining optimum dispersion dependent upon the payload of the transmission system. This includes being dependent upon the bit rate and modulation format(s) of the transmitted signals. Conventional BER measurements usually require the transmission of a particular test signal, such as (pseudo random bit sequence (PRBS), and thus cannot be carried out on live traffic. Conventional BER measurements also require frame synchronization with the received signal, necessitating more hardware. In some systems employing forward error correction (FEC), FEC framing and decoding may also be necessary to carry out BER measurements. Other known systems require clock and data recovery and expensive BER test sets (BERT).

Dispersion optimization of a system at installation and commissioning is a laborious process that requires changes to dispersion compensation at both the transmit end and the receive end because the balance of pre-compensation to post-compensation also must be optimized. This process must be carried out for every channel in a multichannel WDM or DWDM transmission system, leading to an inordinate amount of time spent during the commissioning of the system.

SUMMARY OF THE INVENTION

The present invention addresses the above limitations of known methods for determining optimum dispersion in an optical transmission line. The present invention is directed to aspects relating to rapidly achieving optimum dispersion compensation in an optical transmission system. It was discovered that the reference sensitivity of a phase detector of a data measurement apparatus was strongly affected by the receive dispersion compensation setting. The sensitivity decreased markedly as the dispersion compensation setting was moved away from its optimum value in either direction.

In accordance with one aspect of the present invention, there is provided a method of optimizing dispersion in an optical transmission line. The method comprises receiving an optical signal for at least one selected wavelength channel transmitted on the optical transmission line, mixing the received optical signal with a periodic signal of a period at or near that of the baud of the optical signal to obtain a resulting signal component, measuring the amplitude of a resulting signal component, and setting the optimum dispersion for the at least one selected wavelength channel transmitted on the optical transmission line based on the peak amplitude of the resulting signal component. It should be understood by one of ordinary skill in the art that a "received optical signal," is the detected electrical signal or version resulting from reception of the optical signal, which reception includes an optical-electrical conversion.

In a preferred embodiment, the mixing step of this method further comprises synchronously demodulating the received signal to obtain a d.c. signal component. Alternatively, the mixing step comprises asynchronously demodulating the received signal with a local oscillator (LO) signal to obtain an a.c. signal component. More preferably, the LO signal frequency is offset from the baud frequency of the received signal by about 100 kHz. Most preferably, the received signal is a return-to-zero (RZ) pulse. The received signal may also be a non-return-to-zero (NRZ) pulse or a chirped RZ pulse. In the case of an NRZ pulse format, a frequency-doubling step must precede the mixing step. In addition the received signal may be one of many alternative modulation formats, including but not limited to formats that employ modulation of the phase of the optical carrier, such as RZ DPSK, NRZ DPSK and Duobinary.

In accordance with another aspect of the present invention, there is provided a method of optimizing dispersion in an optical transmission line, comprising receiving an optical signal for at least one selected wavelength channel transmitted on the optical transmission line, synchronously demodulating the received signal, measuring the amplitude of a d.c. signal component of the received synchronously demodulated signal, and setting the optimum dispersion for the optical transmission line based on the peak amplitude of the d.c. signal component. Preferably, the received signal is an RZ pulse. It may also be a NRZ or chirped RZ signal or a signal of alternative modulation formats as described hereinabove. The RZ pulse may be in the linear domain. Preferably, the received signal is mixed with a synchronous recovered clock signal in a microwave mixer. More preferably, the phase of the recovered clock is adjusted to be in-phase with the received signal, whereby synchronous a.m. demodulation of the received signal is achieved.

In accordance with another aspect of the present invention, there is provided a method of optimizing dispersion in an optical transmission line, comprising receiving an optical signal for at least one selected wavelength channel transmitted on the optical fiber transmission line, mixing a local oscillator (LO) signal with the detected electrical version of the received signal to obtain a resulting a.c. signal component, the LO frequency being different from the baud frequency of the detected electrical version of the received signal, measuring the amplitude of a resulting a.c. signal component of the mixed signal, and setting the optimum dispersion for the at least one selected wavelength channel of the optical transmission line based on the peak amplitude of the a.c. signal component.

Preferably, the LO frequency is close to the baud frequency of the detected electrical version of the received signal. More preferably, the LO frequency is offset by about 100 kHz from the baud frequency of the detected electrical version of the received signal. Most preferably, the detected electrical version of the received signal is an RZ pulse. It may also be a NRZ or chirped RZ pulse, or one of the many alternative modulation formats described hereinabove. Preferably, in the case where the modulation format is NRZ, the received optical signal passes through a frequency doubler circuit interposed between the optical receiver and the mixer. Preferably, in the case where the modulation format includes optical phase modulation for the transmission of information, such as in DPSK, the optical signal passes through one or more stages of optical phase demodulation before being received for use.

In all of aspects of the present invention disclosed thus far, the steps of monitoring and setting are most preferably automated.

In yet another aspect of the present invention, there is provided a dispersion optimization apparatus, comprising a receiver for receiving an optical signal for at least one selected wavelength channel transmitted on an optical transmission line, a mixer for mixing the received signal with a periodic signal to obtain a resulting signal component, an amplitude measuring device for measuring the amplitude of the resulting signal component, and a dispersion controller for setting the optimum dispersion for the at least one selected wavelength channel of the optical transmission line based on the peak amplitude of the resulting signal component.

Preferably, the periodic signal is the recovered baud clock signal. Further, the mixer comprises a microwave mixer for mixing an RZ pulse in-phase with the phase of the recovered clock signal and synchronously demodulating the received signal of the at least one selected wavelength channel to obtain a d.c. signal component. Alternatively, the mixer comprises a microwave mixer for asynchronously demodulating the detected electrical version of the received signal of the at least one selected wavelength channel with a local oscillator (LO) signal to obtain an a.c. signal component. Preferably, in this alternative, the LO signal frequency is offset from the baud frequency of the detected electrical version of the received signal by about 100 kHz. Alternatively, the amplitude-measuring device and dispersion controller are preferably automated.

In another aspect of the present invention, there is provided a computer system for monitoring dispersion, the computer system including at least one data-processing unit operable to execute one or more executable programs, the one or more executable programs causing the at least one data-processing unit to perform steps comprising providing an optical sample of at least one selected wavelength channel, providing an RF carrier at a frequency that differs from the baud of the at least one selected wavelength channel by about 100 kHz, coupling the optical sample through an EDFA, coupling the optical sample through a receive photodetector, amplifying the output signal of the photodetector, adjusting the amplified output signal, coupling the adjusted amplified output signal to one input of a microwave mixer, coupling the RF carrier signal to the other input of the microwave mixer, mixing the output signal with the RF carrier frequency to obtain an a.c. signal component, terminating the output of the mixer and a.c. coupling the output to a low frequency (LF) amplifier, coupling the a.c. signal component through an active bandpass filter, coupling the signal component to an average detector, coupling the resulting d.c. signal through an A/D converter, and communicating the d.c. signal to a general purpose computer.

Preferably, in the case where the modulation format is NRZ, the optical signal passes through a frequency doubler circuit interposed between the optical receiver and the mixer. Preferably, in the case where the modulation format includes optical phase modulation for the transmission of information, such as in DPSK, the system further comprises an interferometer coupled between the input signal and the photodetector.

In a preferred embodiment, the general purpose computer system further comprises adjusting the dispersion compensation setting of the at least one selected wavelength channel based on the amplitude of the resulting d.c. signal. Preferably, this aspect comprises monitoring the d.c. signal as dispersion compensating settings are changed.

In yet a further aspect of the present invention, there is provided a dispersion monitoring apparatus, comprising a wavelength channel generator for generating an optical signal of at least one selected wavelength channel, a frequency synthesizer for providing an RF carrier signal where the frequency is different from the baud of the at least one selected wavelength channel, a mixer for mixing the optical signal with the RF carrier, the mixer having at least first and second inputs, the RF carrier signal being coupled to the second input, a photodetector coupled between the wavelength channel generator and the first input to the mixer, a low frequency (LF) amplifier coupled to the output of the mixer, an active bandpass filter coupled to the LF amplifier, an average detector coupled to the active bandpass filter, and an A/D converter coupled between the average detector and a general purpose computer. Preferably, the dispersion monitoring apparatus further comprises an EDFA coupled between the input signal and the photodetector.

Preferably, in the case where the modulation format includes optical phase modulation for the transmission of information, such as in DPSK, the dispersion monitoring apparatus further comprises an interferometer coupled between the input signal and the photodetector.

BRIEF DESCRIPTION OF THE DRAWINGS

For purposes of illustrating various aspects of the invention and to provide a further understanding of the method and system of the invention, together with the detailed description, the drawings show forms that are presently preferred, it being understood, however, that the invention is not limited to the precise arrangements and instrumentalities shown, wherein.

DETAILED DESCRIPTION

Figure 1:
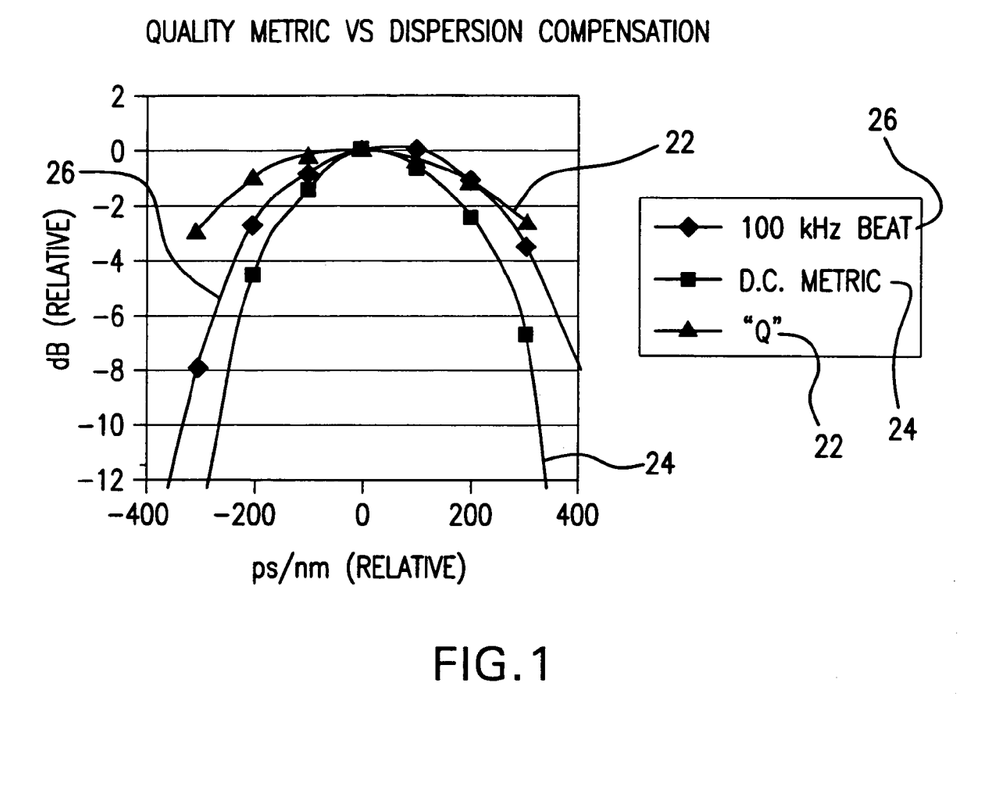
FIG. 1 is a graph of three plots representing three metrics of measuring optimum dispersion.

Referring now to the drawings, wherein like numerals indicate like elements, FIG. 1 depicts a graph 20 of three plots of the relative decibel value of three metrics for measuring dispersion optimization as functions of the relative receive dispersion compensation setting.

As shown, the results of the data points have been normalized so that the peak of the conventional "Q" plot line 22, represented by spaced triangles, is set to zero dispersion and a zero dB measurement value. However, it should be understood that any shift from zero relative to the optimum dispersion is contemplated by and within the scope of this invention. Turning now to the plot lines of FIG. 1, the "Q" plot line 22 represented by spaced triangles is a plot of the conventional means of determining optimum dispersion. That is, as discussed above, the Q-factor of the optical transmission system for a given wavelength channel is estimated by measuring the BER at different threshold settings in the decision circuit. The BER is measured and observed through an eye diagram. This method is cumbersome and time consuming.

Next is the d.c. metric plot 24 represented by spaced squares. This plot 24 is representative of a means for detecting the optimum dispersion in accordance with an aspect of the present invention, which will be described herein below. Finally, the 100 kHz Beat plot 26, represented by spaced diamonds, represents a means for detecting the optimum dispersion in accordance with another aspect of the present invention, which also will be described hereinafter. It is evident from the plots in FIG. 1 that optimum dispersion is selected based upon the peak dB of each metric. Significantly, the peak of the latter two methods, i.e., plots 24 and 26, both covered by aspects of the present invention, yield sharper peaks and thus improved indicators of dispersion optimization values.

In an illustrative example, Table 1 shows the results of a d.c. test.

TABLE 1

| Dispersion Setting | Voltage, mV | Relative Voltage, dB |
|---|---|---|
| 1751 | 3 | −14.0 |
| 1853 | .9 | −4.5 |
| 1955 | 12 | −1.5 |
| 2057 | 15 | .0 |
| 2159 | 14 | −0.7 |
| 2261 | 11 | −2.5 |
| 2363 | .7 | −6.7 |
| 2465 | .1 | −24.0 |

Thus, referring to Table 1 and FIG. 1, there is plotted the relative decibel value of three metrics as a function of relative receive dispersion compensating setting. The dB value of the metric and the value of receive compensation have been both normalized to zero at the point of optimum dispersion compensation. In this illustrative example, the optimum was observed to occur at the same value of receive compensation for all three metrics. If the best Q was 14 dB, that is represented as 0 dB. If that Q were to fall to 11 dB at a different value of receive dispersion compensation, it would be represented as −3dB. The a.c. and d.c. dispersion metrics are represented as dB with respect to their value at optimum receive dispersion compensation.

Figure 2:
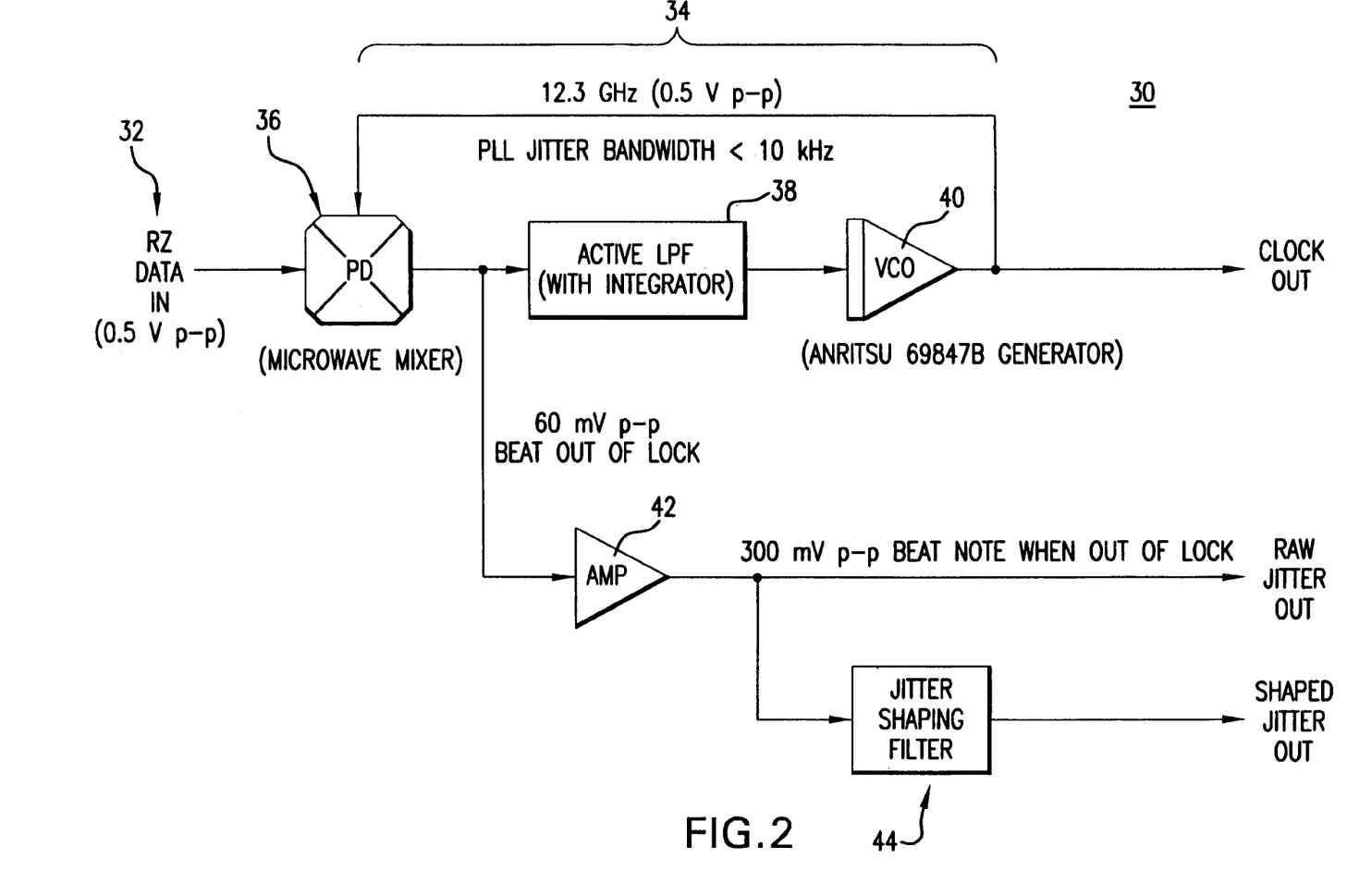
FIG. 2 is a schematic diagram of a system for measuring dispersion optimization in accordance with an embodiment of the present invention.

FIG. 2 illustrates a test setup 30 for measuring jitter and a technique for determining optimum dispersion. By way of a very specific example and in no way meant to limit the scope of the present invention, this circuit 30 was loaded with an RZ data signal 32 on the 1542.6 nm wavelength channel with 2e23-1 PRBS. This channel was transmitted with a group of six wavelength channels spaced at about 33 GHz, the RZ pulse 32 being near the middle of the group. Reported Q during the measurements was in the range of 10 to 13, depending on receive dispersion settings. The optimum receive dispersion setting used was 2057 ps/nm.

In a given setup, a phase detector receives the RZ data signal 32. An optical copy of the selected channel is routed to a receiver including an erbium doped fiber amplifier (EDFA) pre-amp and a photodetector. A wideband amplifier amplifies the output of the photodetector by about 13 dB to a level of about 0.5 V p—p, yielding the signal 32.

The set up shown in FIG. 2 preferably comprises a narrow-band Phase-Locked Loop (PLL) 34, which preferably comprises a microwave mixer phase detector 36, an active lowpass filter 38 and a VCO 40, implemented from a frequency synthesizer with a d.c.-coupled f.m. capability. Jitter bandwidth of the PLL 34 is about 10 kHz so all jitter above 10 kHz in the incoming data is detected by the phase detector 36 and made available at its output when the PLL 34 is in lock. The a.c. jitter output of the phase detector is amplified by a 20 Mhz amplifier 42 and presented to an oscilloscope and spectrum analyzer (both not shown) after being shaped by a jitter shaping filter 44 for viewing. The actual jitter sensitivity of this setup is calibrated by breaking the loop of the PLL 34 and observing the amplitude of the resulting beat frequency at the output of the jitter amplifier. Calibration is achieved by recognizing that the peak-to-peak amplitude of the beat note represents a 180-degree peak-to-peak sinusoidal excursion of phase.

As observed, the amplitude of the calibration sinusoid in the jitter setup decreases markedly when receive dispersion compensation was set away from the optimum value.

Figure 3:
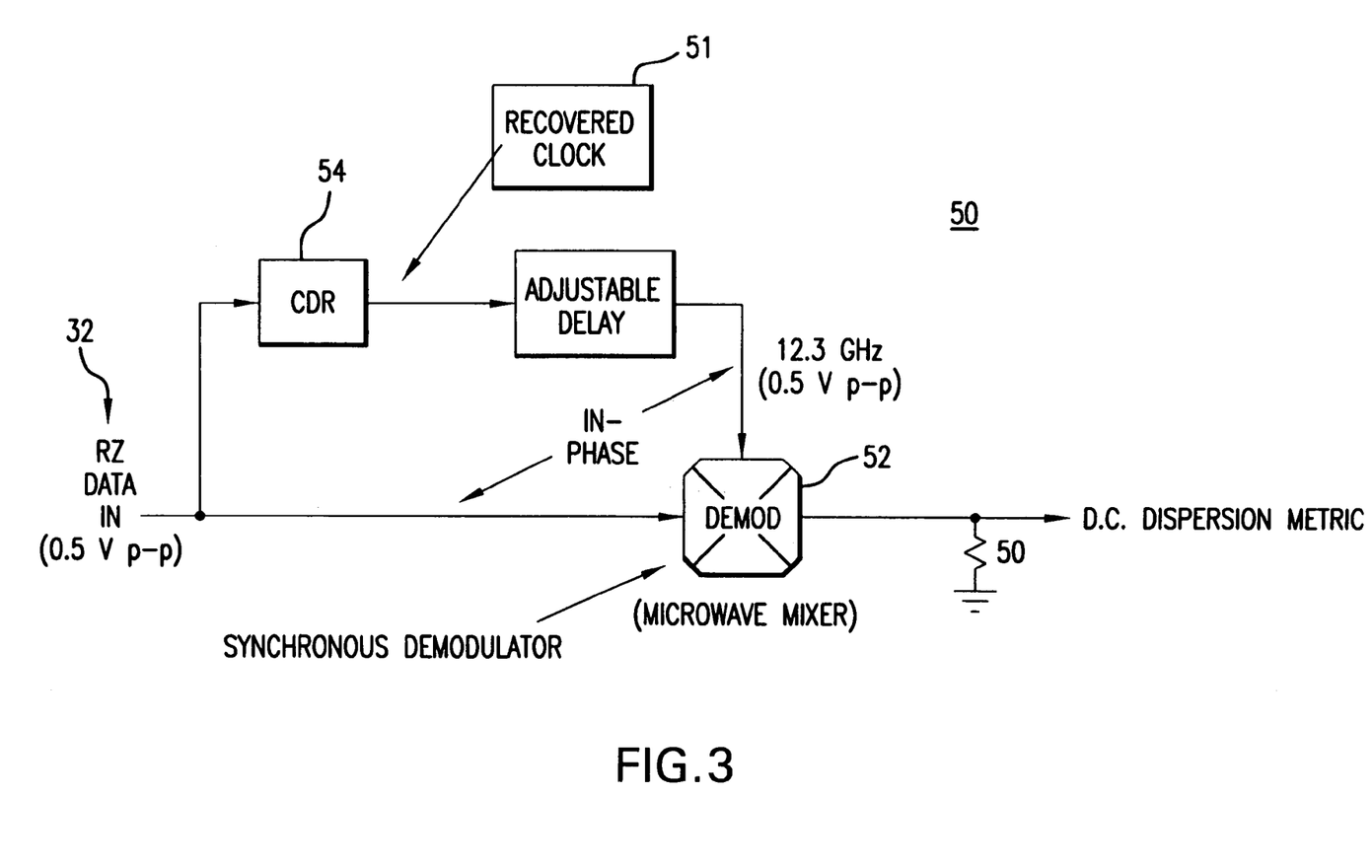
FIG. 3 is a schematic diagram of a system for measuring dispersion optimization in accordance with another embodiment of the present invention.

Referring now to FIG. 3, in this particular embodiment, the system 50 relies on passing the received signal and a corresponding recovered clock 51 into the two ports of a microwave mixer 52. Optionally, the signal is passed through a CDR 54 for creation of the recovered clock 51. The mixer 52 is demodulating the baseband RZ signal and not the optical spectrum. The phase of the recovered clock 51 is adjusted to be in-phase with the received RZ signal, so effectively synchronous a.m. demodulation of the received signal is achieved. This is similar to the setup as described with respect to FIG. 2, except that the clock input is in-phase rather than in quadrature with respect to the RZ signal. The RZ signal in this particular setup when applied to the mixer 52 is still in its linear domain. That is, it has not passed through a limiting amplifier. The output of the microwave mixer contains a d.c. component. This is the metric for finding the optimum dispersion compensation. The value of the d.c. component is found to drop significantly as dispersion is changed from the optimum.

Figure 4:
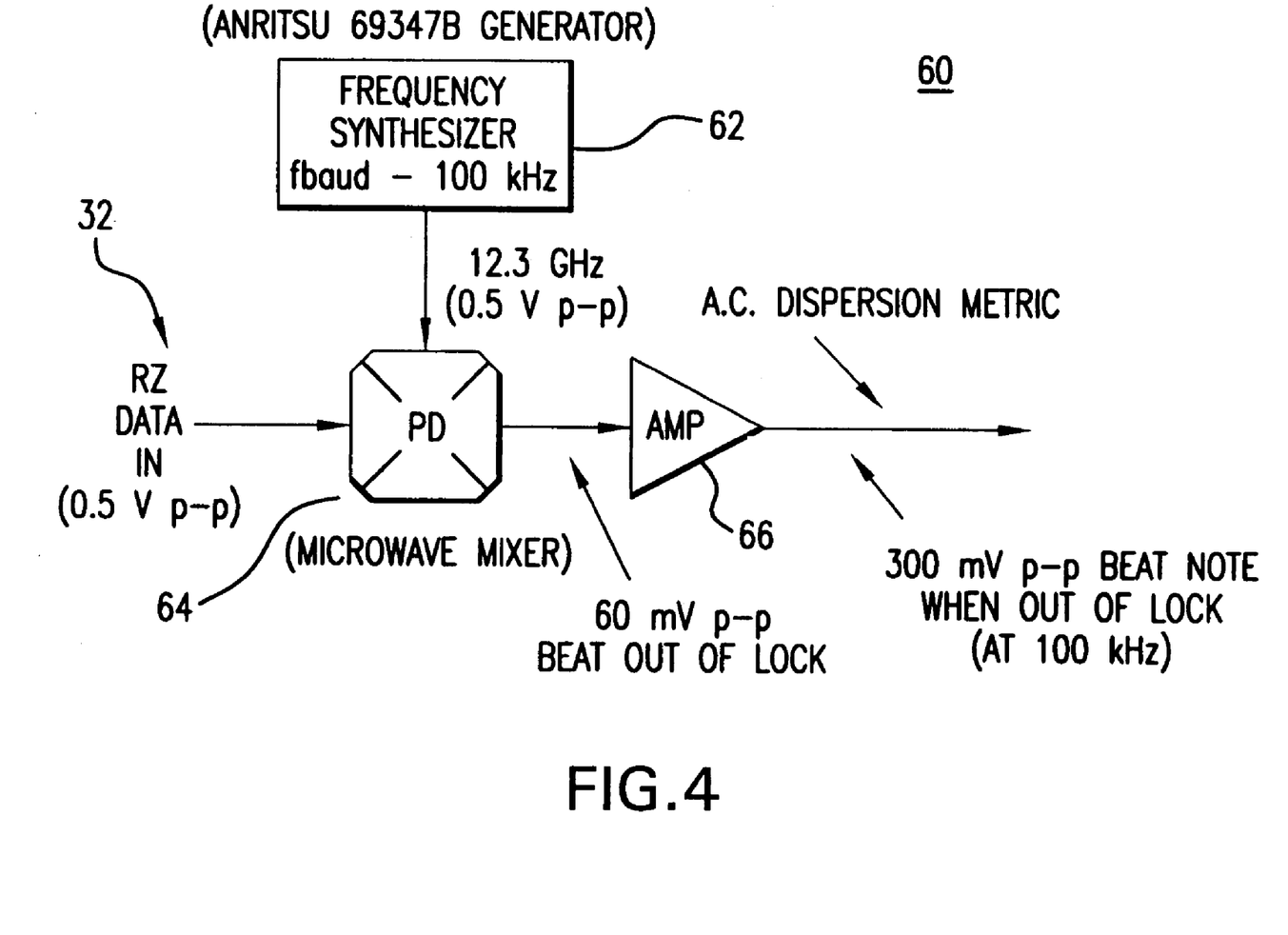
FIG. 4 is a schematic diagram of a system for measuring dispersion optimization in accordance with another preferred embodiment of the present invention.

Referring now to FIG. 4, as an alternative embodiment, this technique is similar to that which was described with reference to FIG. 3, except that this set up is asynchronous in nature. That is, rather than applying a synchronous, properly phased recovered clock to the mixer, a local oscillator (LO) signal from a frequency synthesizer 62 is applied. The LO frequency is set to be close to, but not the same as, the baud frequency of the detected electrical version of the received signal. Preferably, the offset from the baud frequency is about 100 kHz. This is effectively the same as applying a recovered clock whose phase sweeps through 360 degrees every 10 microseconds. The result is an a.c. signal at 100 kHz at the output of the microwave mixer 64. The resulting signal component is then amplified by an amplifier 66. Once again, the amplitude peaks when dispersion is optimized.

Figure 5:
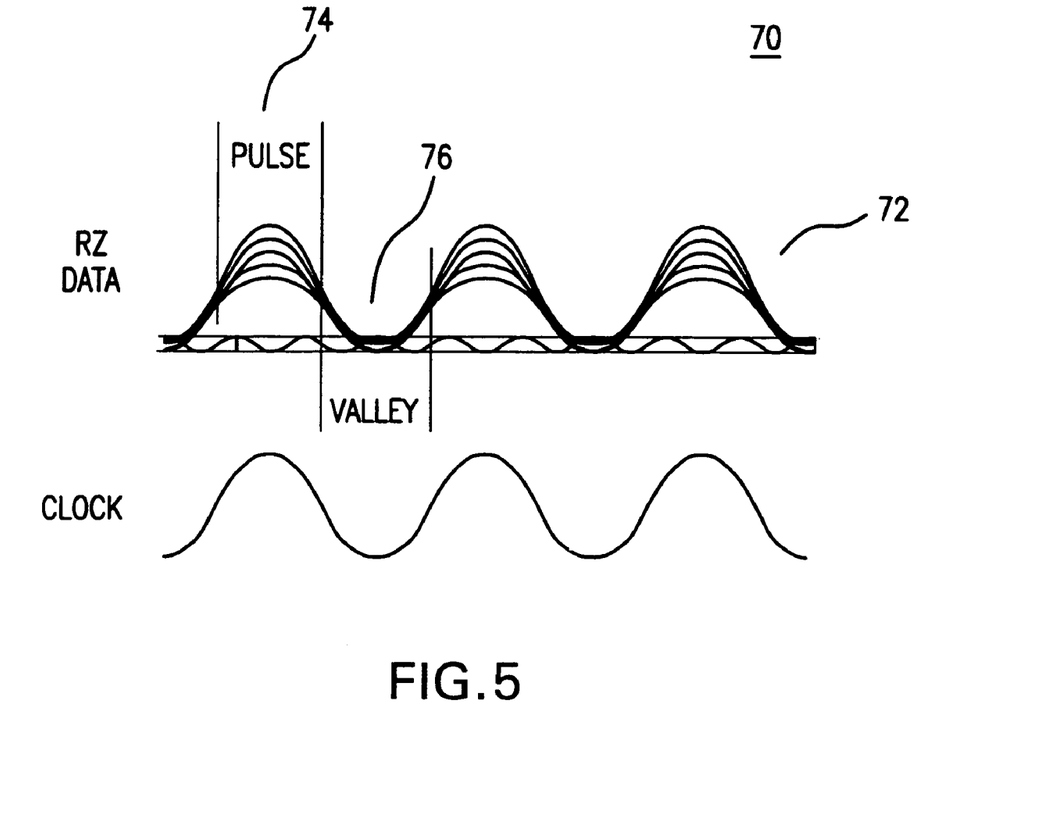
FIG. 5 is a plot of an RZ data pulse train making up an RZ data eye diagram along with a clock pulse train in accordance with aspects of the present invention.

Referring to FIG. 5, for purposes of further describing aspects of the invention, it is useful to make an heuristic evaluation. Consider an RZ data pulse train 72 making up an RZ data eye, as shown in FIG. 5. It is noted that there are two distinct time intervals. The first is the pulse time 74, defined as the time at or about the center of the eye. The second is the valley time 76, defined as the time at or about the midpoint between two pulse times. The signal is ideally always zero during the valley time. On a 50 percent average basis, the signal maps out a sinusoid in the eye pattern. This sinusoid is at the baud frequency of the wavelength channel. It has its positive peaks at the pulse time 74 and its negative peaks at the valley time 76.

If this signal is synchronously detected by multiplying it with an LO sinusoid at the baud frequency in-phase with the mapped-out sinusoidal component of the RZ signal, a positive d.c. voltage results at the output of the mixer. If, alternatively, the LO signal is 180 degrees out of phase so that its positive peaks occur at the valley times, then a negative d.c. voltage results at the output of the mixer. If the LO signal is 90 degrees out of phase, a zero output results at the output of the mixer. Under these conditions, the mixer is acting like a phase detector in a clock recovery PLL.

Based on these observations, it should be understood by one of ordinary skill in the art that synchronous detection with an in-phase LO signal gives an indication of the distribution of the RZ pulse energy within and across its Unit Interval (UI). Energy at or near the pulse time 74 contributes positive voltage to the output of the mixer. Energy at or near the valley time 76 contributes negative voltage to the output.

A well-formed RZ pulse will have the great majority of its energy concentrated in the pulse time 74 half of the UI. An RZ signal that has been affected by significant dispersion will, on average, have its energy spread across the full UI. Individual pulses that happen to arrive in the pulse time will create positive output only to be cancelled by other pulses or portions of pulses that arrive during the valley time.

Now consider using an LO whose frequency differs from the baud frequency by a relatively small amount, such as 100 kHz or so. The phase relationship between the LO signal and the RZ data signal will be swept through at the rate of the difference frequency. This creates an intermediate frequency (IF) at the difference frequency. In essence, an a.c. version of the above-mentioned d.c. voltage is created. Again, if a well-defined RZ data signal is present, a strong a.c. IF signal will be created because most of the RZ pulse energy is concentrated in one-half of the UI. If an RZ signal suffering from dispersion is present, with its energy almost evenly spread across the UI (on average), then virtually no a.c. IF signal will be produced.

In short, the test is sensitive in part because pulse energy lying in the valley time is subtracted from pulse energy lying in the pulse time.

Preferred embodiments of the present invention include conveying the output of the microwave mixer to a computer processor via an A/D converter. The processor could be used to modify receive dispersion compensation settings and automatically find the optimum dispersion setting.

Figure 6:
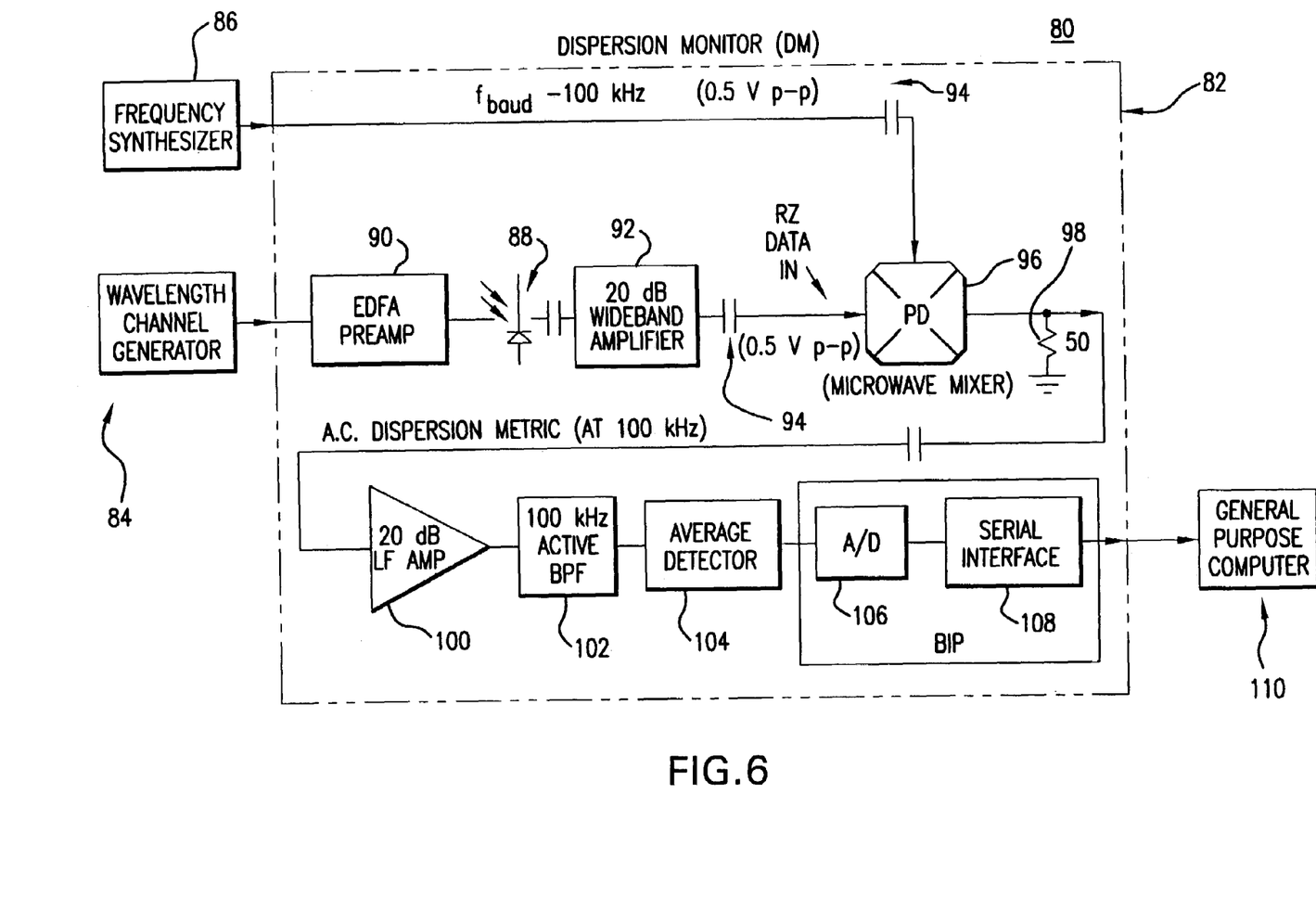
FIG. 6 is a schematic diagram of a system for measuring dispersion optimization in a closed loop application in accordance with another preferred embodiment of the present invention.

Referring now to FIG. 6, there is provided a setup 80, which includes a dispersion monitor 82. As discussed with respect to the setup in FIG. 3, an optical sample of a selected wavelength channel is coupled to the dispersion monitor from a wavelength channel generator 84. A frequency synthesizer 86 provides an RF carrier to the dispersion monitor 82 at a frequency that differs from the baud of the channel by about 100 kHz. The optical input is coupled to a receive photodetector 88. An optional EDFA 90 pre-amp may be placed upstream from the photodetector 88. The output of the photodetector 88 may be amplified by a 20 dB, 20 GHz amplifier block 92, adjusted in level by fixed attenuators 94 and passed to one input of the microwave mixer 96. The carrier from the external frequency synthesizer 86 is passed to the other input of the mixer 96. Both inputs to the mixer 96 are a.c. coupled.

The output of the mixer is terminated in 50 ohms resistance 98 and a.c. coupled to a 20 dB LF amplifier 100 implemented with an operational amplifier. The signal then passes through an active 100 kHz bandpass filter 102 and on to an average detector 104. The resulting d.c. signal is passed through an A/D converter 106 and communicated via an RS-232 data bus 108 to a general purpose computer 110.

The general purpose computer 110 may include software to interface the dispersion monitor 82 and automate the finding of optimum receive dispersion compensation by monitoring the dispersion monitor result as it changes dispersion compensation settings. One example of automation may include optimizing one wavelength channel at a time. Then, the computer 110 can change its selected wavelength channel and move on to the next wavelength channel. Then, the receive computer can be set up to communicate data and commands to the transmit computer (not shown) so as to coordinate a sequence or algorithm involving adjustments to both transmit compensation and receive compensation. A family of curves of performance as a function of receive compensation for a set of different values of transmit compensation can then be automatically mapped out.

It should be noted that although the RZ modulation format has been used throughout this disclosure, one of ordinary skill in the art should appreciate that other modulation formats can be used and would still be within the scope of the present invention. For example, RZ DPSK, NRZ DPSK and perhaps other phase-keyed formats like Duobinary can be used and are contemplated. With RZ DPSK, similar methods may be used to determine optimum dispersion because the raw, un-phase-detected optical carrier contains RZ pulses. Alternatively, after an interferometer, either constructive or destructive output can be used because each looks like conventional RZ at that point.

With NRZ phase-keyed formats, because the raw optical carrier contains little or no a.m., the technique would include passing the optical signal through an interferometer prior to connection to the optical receiver. At that point, the system will have NRZ-like data at each output. The NRZ-like data can then be passed through a frequency doubling circuit prior to application to the mixer of the present invention.

Figure 7:
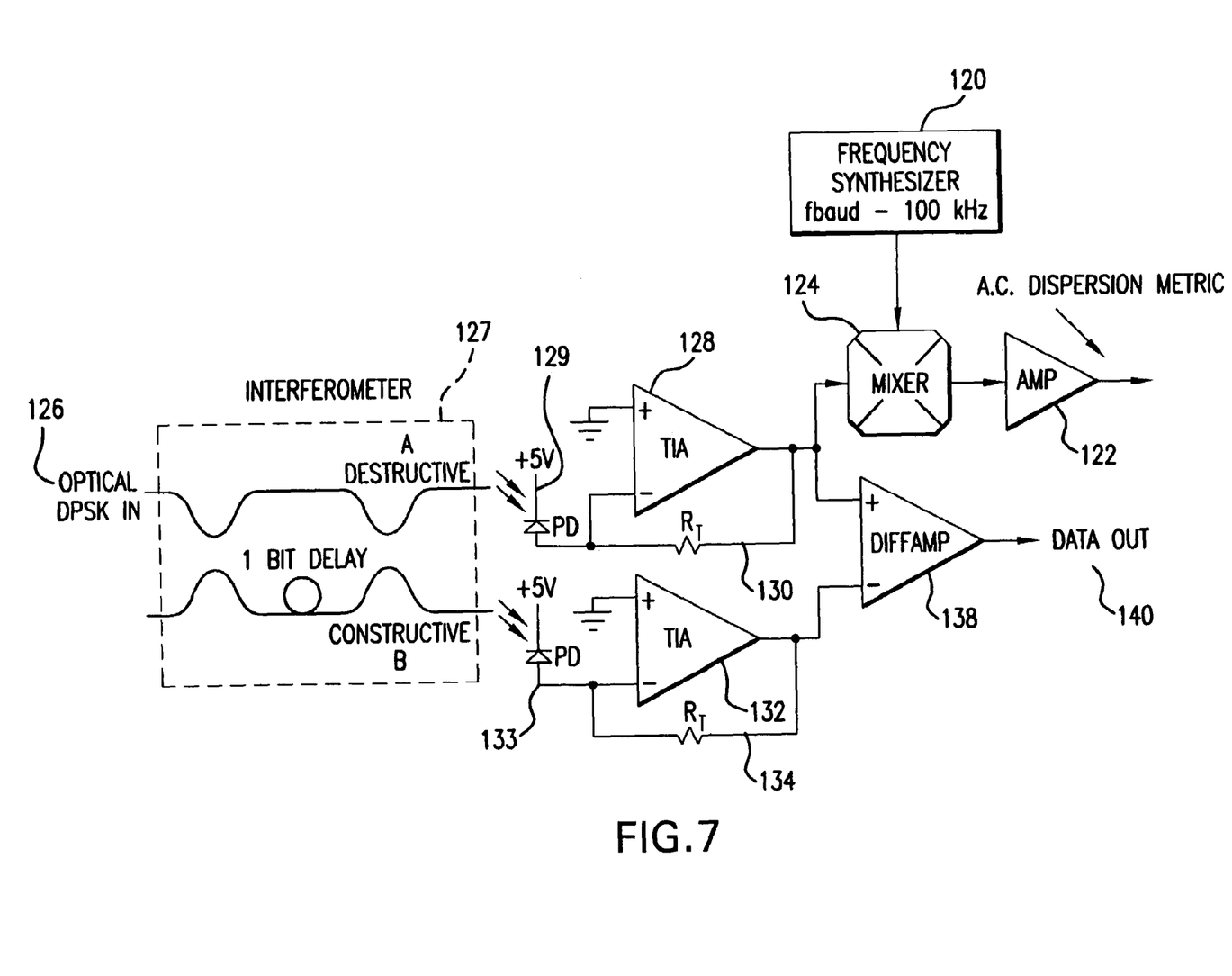
FIG. 7 is a schematic diagram of a system for measuring dispersion optimization in a system employing RZ DPSK modulation.

Referring now to FIG. 7, as an alternative embodiment for use with optical signals employing the RZ DPSK modulation format, this technique is similar to that described in FIGS. 3 and 4, except that in this arrangement the optical signal provided for reception by the dispersion measuring circuitry emanates from one or the other of the constructive or destructive outputs of the optical DPSK demodulator. At this point in the DPSK optical demodulator system, the signals have essentially been converted to RZ electrical format, and therefore all of the aspects of this invention heretofore described apply equally. Similar and alternative approaches to the application of this invention to modulation formats employing phase modulation are to be considered to be within the scope of this invention.

FIG. 7 depicts one of many possible implementations of optical DPSK receivers that should be familiar to one skilled in the art. FIG. 7 also includes circuitry that implements an asynchronous version of the present invention as applied to DPSK. This circuitry comprises a frequency synthesizer 120, an amplifier 122, and a mixer 124.

As shown in FIG. 7, an optical RZ DPSK signal 126 is sent through the system including an interferometer (DPSK demodulator) 127, and the microwave mixer 124 receives its signal from the output of one of the trans impedance amplifiers (TIAs) 128, 132. Each TIA 128, 132 respectively includes a photodiode 129, 133 and a resistor 130, 134, and the TIAs have received the optical signal after that signal has passed through the DPSK (interferometer demodulator) 127. The output from each of the TIAs is passed through a differential amplifier 138 to create received data 140 for the system.

FIG. 7 illustrates the application of the asynchronous version of the technique to DPSK, but the application of the synchronous technique could be used in a variation of this scheme using the principles taught herein. Note that, for RZ forms of phase-keyed modulation formats (like DPSK), it is also possible to apply either of the dispersion measurement techniques directly to the optical input signal as received, without having to go through the interferometer. This approach may be applicable to low-cost test-equipment approaches for checking dispersion on DPSK systems.

Figure 8:
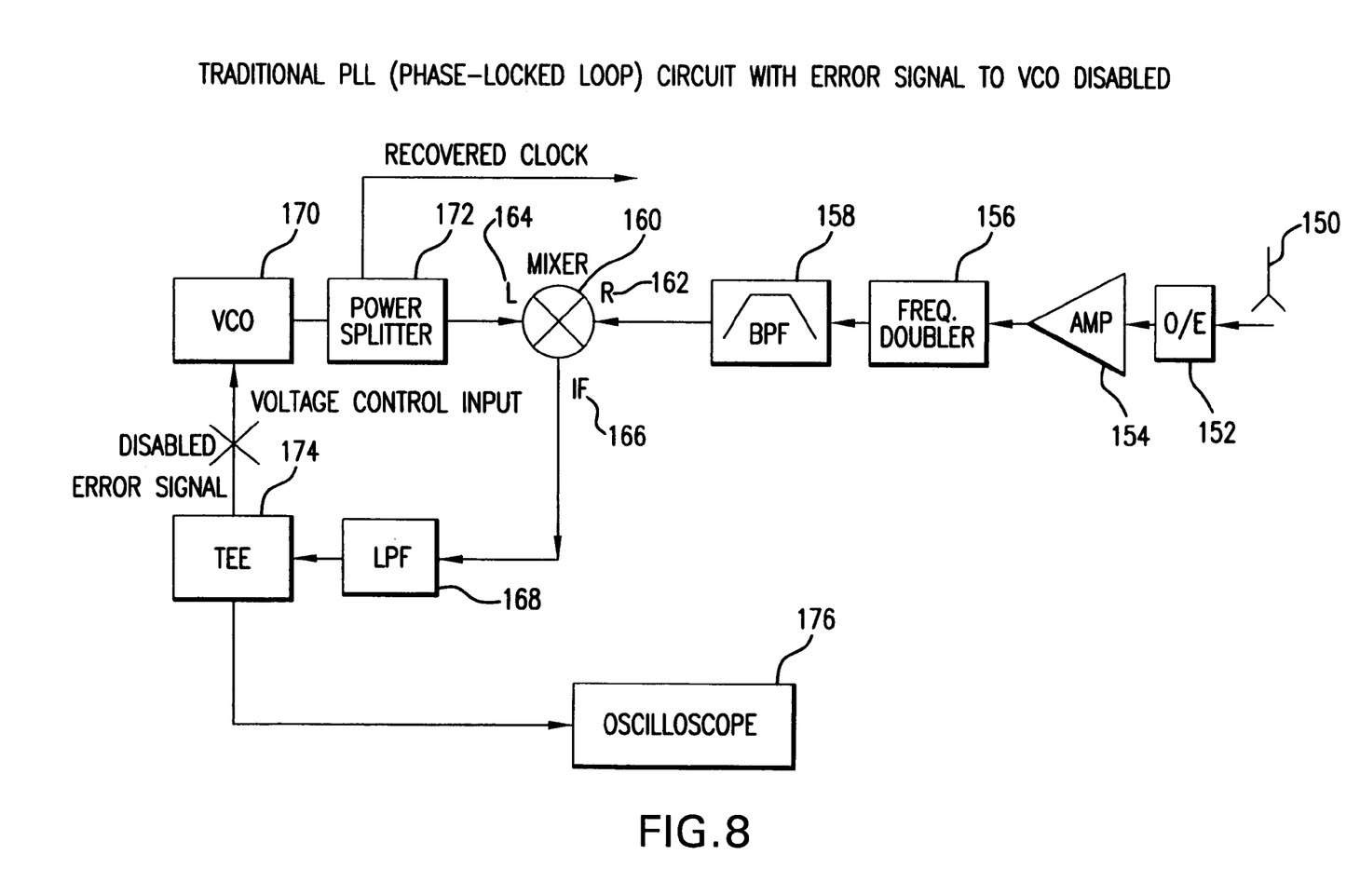
FIG. 8 is a schematic diagram showing an experimental arrangement used to collect data in which the maximum of the measured peak-to-peak signal coincides with the optimum system performance.

Another embodiment of the invention shown in FIG. 8 depicts the asynchronous realization with a phase-locked loop (PLL) circuit being operated in the free run condition. PLL circuits are widely used in clock recovery circuits. In this embodiment, an optical signal 150 is received and converted to an electrical signal via an O/E converter 152 and passed through an amplifier 154. A frequency doubler 156 serves to extract a baud rate clock signal from an NRZ data stream. This same topology could also accommodate an RZ type signal. The clock signal already present in an RZ type signal would simply transmit the frequency doubler.

The clock signal transmits an electrical band pass filter 158 centered at the baud and serves to remove unwanted harmonics generated during the doubling process. This clock is directed to the reference port (R) 162 of a mixer 160 where it is compared with the output from a voltage controlled oscillator (VCO) 170. The output from the VCO transmits a power splitter 172 before being input to the local oscillator port (L) 164 of the mixer. The intermediate frequency (IF) port 166 is directed to a low pass filter (LPF) 168.

In a typical phase-locked loop design the output from the mixer and low pass filter combination, commonly referred to as a phase detector output or error signal would be directed to the voltage controlled input of the VCO 170. In the embodiment shown in FIG. 8, the phase detector output or the error signal passing through Tee 174 is disabled therefore not making a connection to the voltage controlled input of the VCO 170. A phase-locked loop circuit working in this mode is commonly referred to as being operating in a free run condition. The IF port 166 passing through a low pass filter 168, produces a signal that is the frequency difference between the line rate and the local oscillator frequency with an amplitude proportional to the line rate frequency component of the received electrical spectrum. The peak-to-peak or RMS voltage is then measured as a function of pre and post dispersion compensation. The amplitude of this signal is a measure of signal quality and increases as the accumulated dispersion is optimized and the pulse regains some fidelity. The maximum amplitude coincides with the optimum system performance. The signal is observed and measured using oscilloscope 176

Figure 9:
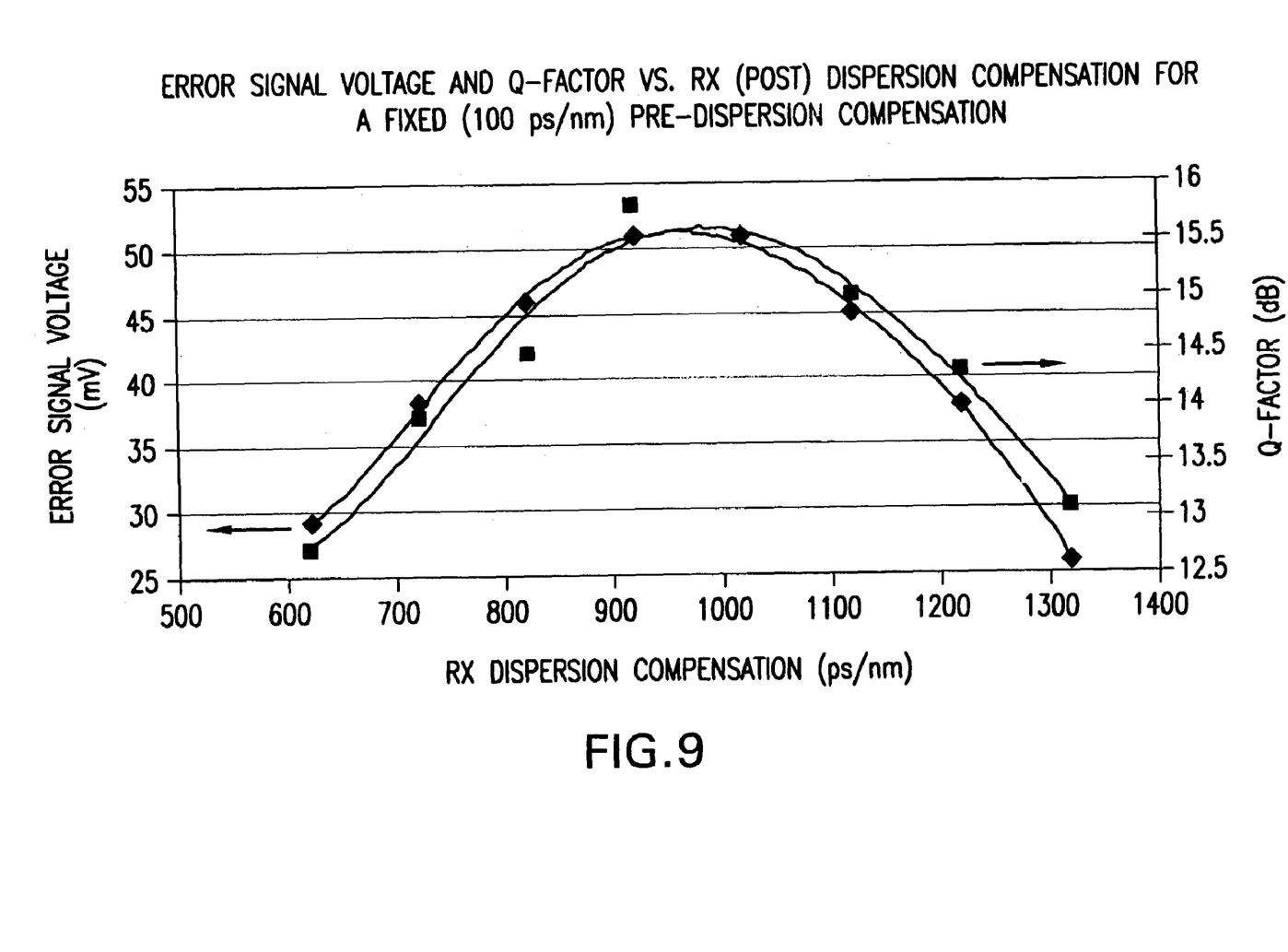
FIG. 9 is a graph showing the results of data collected using the arrangement of FIG. 8.

FIG. 9 shows the results of data collected using the arrangement of FIG. 8, and more specifically, the result of a 7,000 km transmission experiment with 32 ps RZ pulses. The optimum system performance was established with the conventional means where the tester would fix the pre-dispersion compensation and then sweep the post-dispersion and then embark on the process of optimizing several parameters to eventually measure the optimum system performance for each value of pre and post dispersion compensation. The system performance was found to be optimum with 100 ps/nm of pre-dispersion compensation and 950 ps/nm of post-dispersion compensation. FIG. 9 also shows that the measured peak-to-peak phase detector voltage or error signal coincides with the optimum system performance and was obtained without laborious parameter optimization.

Although preferred systems have been described hereinabove, other combinations of equipment can be used without deviating from the scope of the present invention. For example, in the asynchronous version, the frequency synthesizer may be replaced by a MUX chip whose CMU creates the LO signal, based on a clock 16 crystal oscillator or VCXO operating 100 kHz offset from the baud. Also, a simple low-frequency active filter tuned to 100 kHz, combined with a simple average detector and perhaps an A/D converter, may replace the spectrum analyzer for measurement of the amplitude of the a.c. signal.

The d.c. version, on the other hand, could be implemented by using a CDR to recover the clock. Then, phasing its recovered clock output appropriately for application to the microwave mixer.

Also, the above setups can be applied to other applications. For example, the metric can provide reliable and fast indication of loss of signal because the metric responds very selectively to the RZ signal itself and largely ignores noise. It may also be useful as an age detector, an in-service monitor or used in the reconfiguring of networks.

There are several advantages realized by the present invention. By way of example only and in no way limiting, the present invention, as compared to conventional measurements and setting of optimum dispersion, is relatively more sensitive than BER and Q-factor measurements, which allows preferred systems and methods to obtain more accurate results in relatively shorter time. The systems and methods described herein are independent of data payload and therefore can run on live traffic (i.e. real data) as well as PRBS or other data.

The systems and methods described herein do not require framing and/or FEC of the received signal for their operation. Preferred systems and methods can be run in a completely passive, non-intrusive manner. All that is needed is a sample of the optical signal. This allows for real-time, in-service monitoring and even optimization. The present invention is insensitive to the amplitude of the received optical signal. The methods and systems are relatively faster than conventional systems and there is no need for data recovery. Preferred systems and methods are easily automated because there is no need for re-optimization of the receiver with changes in dispersion setting or wavelength channel.

With respect to the automated preferred embodiment, this makes possible the ability to automate the greater portion of dispersion optimization of a system at installation, which requires changes to dispersion compensation at both the transmit end and the receive end because the balance of pre-compensation to post-compensation must be optimized. This process must be carried out for every channel in a WDM optical transmission system.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of optimizing dispersion in an optical transmission line, comprising:
   receiving an optical signal for at least one selected wavelength channel transmitted on the optical transmission line;
   mixing the received optical signal with a periodic signal of a period at or near that of the baud of the optical signal to obtain a resulting signal component;
   measuring the amplitude of a resulting signal component; and
   setting the optimum dispersion for the at least one selected wavelength channel transmitted on the optical transmission line based on the peak amplitude of the resulting signal component.

2. The method of claim 1, wherein the step of mixing comprises synchronously demodulating the received signal to obtain a direct current (d.c.) signal component.

3. The method of claim 1, wherein the step of mixing comprises asynchronously demodulating the detected electrical version of the received signal with a local oscillator (LO) signal to obtain an alternating current (a.c.) signal component.

4. The method of claim 3, wherein the LO signal frequency is offset from the baud frequency of the detected electrical version of the received signal by about 100 kHz.

5. A method of optimizing dispersion in an optical transmission line, comprising:
   receiving an optical signal for at least one selected wavelength channel transmitted on the optical transmission line;
   synchronously demodulating the received signal to obtain d.c. signal component;
   measuring the amplitude of a d.c. signal component of the received synchronously demodulated signal; and
   setting the optimum dispersion for the optical transmission line based on the peak amplitude of the d.c. signal component.

6. The method of claim 1 or 5, wherein the received signal is selected from a group, comprising an RZ pulse, an NRZ pulse or a chirped RZ pulse.

7. The method of claim 6, wherein the RZ pulse is in the linear domain.

8. The method of claim 5, wherein the received signal is mixed with a synchronous recovered clock signal in a microwave mixer.

9. The method of claim 8, wherein the phase of the recovered clock is adjusted to be in-phase with the received signal, whereby synchronous amplitude modulation (a.m.) demodulation of the received signal is achieved.

10. The method of claim 5, wherein the received signal is passed through a frequency doubler circuit before being synchronously demodulated.

11. A method of optimizing dispersion in an optical transmission line, comprising:
   receiving an optical signal for at least one selected wavelength channel transmitted on the optical fiber transmission line;
   mixing a local oscillator (LO) signal with the detected electrical version of the received signal to obtain an a.c. signal component, the LO signal frequency being different from the baud frequency of the detected electrical version of the received signal;
   measuring the intermediate frequency (IF) signal amplitude of a resulting a.c. signal component of the mixed signal; and setting the optimum dispersion for the at least one selected wavelength channel of the optical transmission line based on the peak IF signal amplitude of the a.c. signal component.

12. The method of claim 11, wherein the LO frequency is close to the baud frequency of the detected electrical version of the received signal.

13. The method of claim 12, wherein the LO signal frequency is offset by about 100 kHz from the baud frequency of the detected electrical version of the received signal.

14. The method of claim 13, wherein the detected electrical version of the received signal is selected from a group, comprising an RZ pulse an NRZ pulse or a chirped RZ pulse.

15. The method of claim 11, wherein the received signal is passed through a frequency doubler circuit before it is mixed with the LO signal.

16. The method as in any one of claims 1, 5 or 11, wherein the received signal employs phase modulation of an optical carrier of said received signal.

17. The method of claim 15, wherein the received signal is an RZ differential phase shift keying (DPSK) signal.

18. The method of claim 15, wherein the optical signal passes through one or more stages of optical phase demodulation before being received for use.

19. The method as in any one of claims 1, 5 or 11, wherein the steps of measuring and setting are automated.

20. A dispersion optimization apparatus, comprising:
a receiver for receiving an optical signal for at least one selected wavelength channel transmitted on an optical transmission line;
a mixer for mixing the received signal with a periodic signal to obtain a resulting signal component;
an amplitude measuring device for measuring the amplitude of a resulting signal component; and
a dispersion controller for setting the optimum dispersion for the at least one selected wavelength channel of the optical transmission line based on the peak amplitude of the resulting signal component.

21. The apparatus of claim 20, wherein said periodic signal is a recovered baud clock signal.

22. The apparatus of claim 21, wherein the mixer comprises a microwave mixer for mixing an RZ pulse in-phase with the recovered baud clock signal and synchronously demodulating the received signal of the at least one selected wavelength channel to obtain a d.c. signal component.

23. The apparatus of claim 20, wherein said periodic signal is a local oscillator (LO) signal that is asynchronous with the baud frequency of the detected electrical version of the received signal.

24. The apparatus of claim 23, wherein the mixer comprises a microwave mixer for asynchronously demodulating the detected electrical version of the received signal of the at least one selected wavelength channel with the local oscillator (LO) signal to obtain an a.c. signal component.

25. The apparatus of claim 23, wherein the LO signal frequency is offset from the baud frequency of the detected electrical version of the received signal by about 100 kHz.

26. The apparatus of claim 20, wherein the amplitude-measuring device and dispersion controller are automated.

27. The apparatus of claim 20, wherein said optical signal has undergone one or more steps of optical phase demodulation.

28. The apparatus of claim 20, wherein said received signal has undergone the step of frequency doubling.

* * * * *